V. J. KOVZOVICH.
AUTOMOBILE SIGNALING DEVICE.
APPLICATION FILED AUG. 20, 1919.
1,337,405.
Patented Apr. 20, 1920.
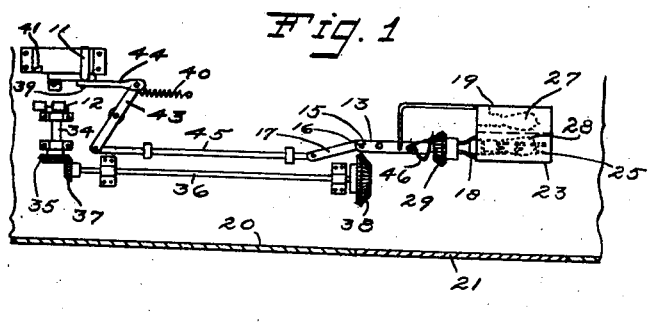
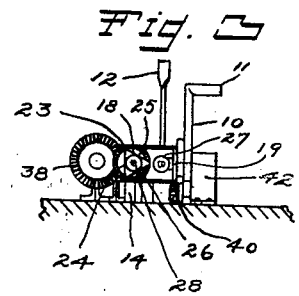
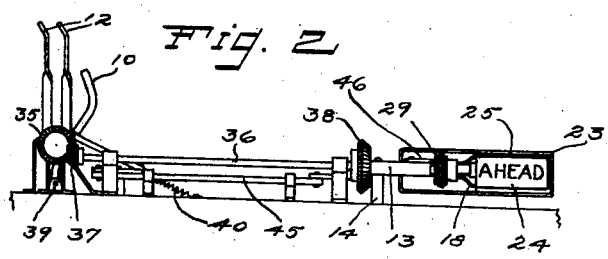
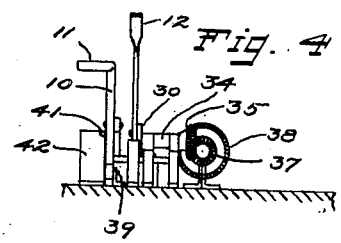
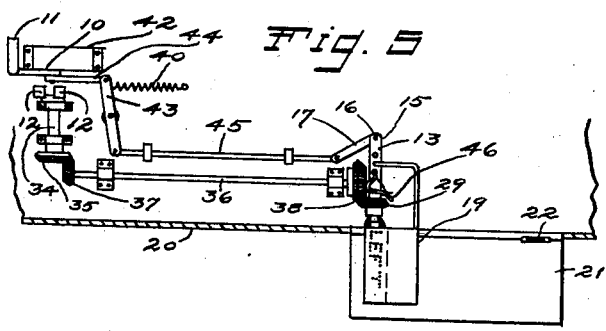
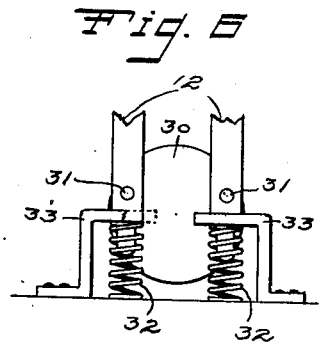
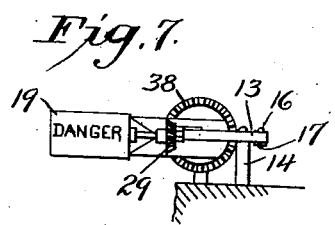
Inventor
Vincent John Kovzovich
By Louis M. Schmidt
Atty.

UNITED STATES PATENT OFFICE.

VINCENT JOHN KOVZOVICH, OF NEW BRITAIN, CONNECTICUT, ASSIGNOR OF ONE-HALF TO JAMES LETSKY, OF NEW BRITAIN, CONNECTICUT.

AUTOMOBILE SIGNALING DEVICE.

1,337,405.  Specification of Letters Patent.  Patented Apr. 20, 1920.

Application filed August 20, 1919. Serial No. 318,642.

*To all whom it may concern:*

Be it known that I, VINCENT JOHN KOVZOVICH, a citizen of Poland, residing at New Britain, in the county of Hartford and State of Connecticut, have invented certain new and useful Improvements in Automobile Signaling Devices, of which the following is a specification.

My invention relates to improvements in automobile signaling devices, and the object of my improvement is to produce a device that can be applied to automobiles and can be actuated by the operator for indicating a proposed change of movement or direction and that is simple in its application and manner of use.

In the accompanying drawing:—

Figure 1 is a plan view of my new automobile signaling device.

Fig. 2 is a side elevation of the same.

Fig. 3 is an end elevation of the same.

Fig. 4 is an elevation of the other end.

Fig. 5 is a plan view showing the parts in a different position from that of Fig. 1.

Fig. 6 is a fragmentary elevational view on an enlarged scale showing the shift mechanism.

Fig. 7 is a fragmentary and diagrammatic view, corresponding to Fig. 3, being a rear elevation, with the parts in the position shown in Fig. 5.

My improved automobile signaling device comprises a set of display signals combined with means for bringing them into position for use and for withdrawing them from such position and also for changing the relative positions so as to indicate different intended movement or change of movement of the automobile, a foot lever 10 with a tread piece 11 for receiving the foot of the operator being operated to set the signaling devices generally and to expose part of the display devices and tripping or shifting mechanism that is operated by one or the other of a pair of shift handles 12 serving to change the detailed arrangement of the display devices that are exposed.

A horizontally swinging bar 13 pivoted on a post 14 supports the display devices and is positioned normally and when inactive in the longitudinal direction relatively to the automobile and is swung to the transverse position for display, the inner arm 15 on the inner side of the post 14 being connected by means of a pin 16 with a link 17 for effecting the swinging movement.

The display devices are connected to the outer end portion of the bar 13 and extend outwardly from the said outer end portion, and comprise a set of display devices supported in a skeleton frame 18 of triangular form of cross-section that is positioned in axial alinement with the bar 13 and constructed and arranged to be shifted by a rotative movement in a manner to be described, and also a single display device 19 that is fixedly secured to the bar 13 and comprises the one word "Danger."

The display devices are normally positioned on the inner side of the side wall 20 of the automobile and are moved outwardly through an opening in the said side wall 20 that is closed normally by door 21 that is held in the closed position by means of a pair of spring hinges 22 that serve to support the said door 21. The frame-work 23 of the "danger" signal 19 contacts with the door 21 when swung forwardly to the active position and forces the door 21 open in opposition to the spring hinges 22.

The "danger" signal 19 is positioned so as to be visible from the rear when exposed to view and is not changed, other than being swung back and forth between the exposed and active position and the concealed or inactive position.

The frame 18 is of triangular form, having three faces each of which is in the form of a panel, and the display word for the said panels respectively comprise for one the word "Ahead", for another the word "Left", and for the third the word "Right".

The parts are constructed and arranged so that panel 24 having the word "Ahead" is in a vertical plane normally and is retained in such a plane when the arm 13 is swung to the display position, being exposed so as to be visible from the front, and preferably, as in the drawings, at the left side of the automobile, suitably to be seen by the operator of a passing car, the cars passing one another on the right side.

The other two panels comprise the panel 25 having the word "Left" and the panel 26 having the word "Right", and these are brought into the position of the panel 24, as described, by operating one or the other of the vertically directed handles 12.

A lamp 27 is provided for illuminating the "danger" signal 19 and a lamp 28 is housed within the frame 18 for illuminating the panels 24, 25, and 26, the letters being in the form of perforations in sheet metal, as is common.

The frame 18 is supported axially from the end face of a bevel gear structure 29 that is rotatively mounted on the end of the bar 13.

The shift handles 12 are connected to the end face of a disk 30 by means of pins 31. The disk 30 is normally positioned in a definite position by means of a pair of coil springs 32 that contact with the lower ends of the handles 12, the upward movement of the springs 32 being limited by suitable stop devices 33.

The shifting disk 30 is supported on one end of a short horizontal shaft 34 and on the other end thereof is a bevel gear 35.

Intermediate the said bevel gear 35 and the bevel gear 29 is a connecting horizontal shaft 36 having at the ends bevel gears 37 and 38 that are suitable for operatively connecting the shifting disk 30 and the frame 18 for effecting the desired movement of the frame 18, as described.

The tread lever 10 extends generally vertically in the normal position, or slightly inclined rearwardly, being pivotally supported by the lower end by means of a pin 39, is held in the rearward position normally by a spring 40, and may be locked in the forward position, or position of use, by engagement with a stop 41 in the form of a notch in a guard plate 42.

The spring 40 is connected to a horizontally swinging lever 43 and the tread arm 10 is connected to the said lever 43 by means of a link 44.

Operatively connecting the lever 43 and the link 17 is a slide-rod 45.

The spring 40 tends to withdraw the display devices within the automobile, inside the side wall 20.

Pushing the tread arm 10 forwardly and locking the same serves to display "Danger" at the rear and "Ahead" at the front. By operating one or the other of the handles 12 there is displayed according to the intention of the operator, either "Left" or "Right."

A spring operated positioning catch 46 engages normally with the gear 29 when not engaged with the gear 38 and is thrown out of engagement by abutting with the end face of the said gear 38.

The two panels of the frame 18 that are inactive and not intended to be exposed are opposed to the rear face of the "danger" signal and concealed thereby.

The drawings are essentially diagrammatic representations of the device, which operates as follows:—

The device can be set back and forth between the inactive and the active positions by the operation of the foot lever.

When set to the active position the device is operative to display two signals or display devices, one being in a position suitable for being observed from the rear and the other from the front. The device displayed from the rear comprises the word "Danger," and is not changed.

The device displayed from the front is one of three devices comprising a set that is mounted so as to rotate for changing the display, one being exposed at the front and the other two being concealed from view by the device mentioned above as being displayed from the rear.

The three devices comprising the set mentioned are arranged in triangular form and the device is constructed and arranged so that one particular display device, having the word "Ahead" is normally shown, and by rotating the set in one direction the device for "Right" will be shown and by rotation in the reverse direction the device "Left" will be shown. There is one handle for shifting in one direction and another for shifting in the reverse direction.

After the release of either handle the "ahead" condition of display is restored.

I claim as my invention:—

1. An automobile signaling device comprising a frame having a set of panels for individual display consisting of three panels, arranged in triangular form, means tending to position the said frame so that one of the said panels will be set to the display position, the said frame being constructed and arranged so as to be rotatable in one direction for setting a second of the said panels to such display position and in the reverse direction for setting the third of the said panels to such position, and two handle devices being provided, one for effecting rotation in the one direction and the other for effecting rotation in the said reverse direction.

2. In an automobile signaling device, a frame having a set of panels arranged in triangular form, and provided with means for being shifted for alternatively displaying individually each of the said panels, and a display panel structure adapted to support a fixed and unchanged display device positioned in opposition to the said frame and on the side remote from the individual panel that is in the exposed position.

3. In an automobile signaling device as described in claim 2, and means for simultaneously swinging the said frame and structure back and forth between the active and the inactive position.

VINCENT JOHN KOVZOVICH.